United States Patent [19]

Omata

[11] 4,452,170
[45] Jun. 5, 1984

[54] ELECTROLYTE IMPREGNATING DEVICE FOR CAPACITOR ELEMENTS

[75] Inventor: Katsumori Omata, Tokyo, Japan

[73] Assignee: Far East Engineering Company, Ltd., Tokyo, Japan

[21] Appl. No.: 457,214

[22] Filed: Jan. 11, 1983

Related U.S. Application Data

[63] Continuation-in-part of Ser. No. 327,218, Dec. 3, 1982, abandoned, which is a continuation of Ser. No. 153,008, May 27, 1980, abandoned.

[51] Int. Cl.³ .............................................. B05C 3/02
[52] U.S. Cl. ........................................ 118/50; 118/423; 118/425; 118/503; 118/421; 427/80; 427/81
[58] Field of Search ............ 269/903, 153, 43, 254 R; 118/503, 423, 421, 50, 425, 428, 416, 426, 400, 427, 505; 427/79, 80, 81, 350, 443.1; 204/199, 214, 297 W, 201

[56] References Cited

U.S. PATENT DOCUMENTS

| 2,120,816 | 6/1938 | Schnoll | 118/50 |
| 2,163,213 | 6/1939 | Springer | 427/81 X |
| 2,910,959 | 11/1959 | Drom et al. | 118/50 |
| 2,949,640 | 8/1960 | Collins et al. | 427/81 X |
| 3,212,688 | 10/1965 | Lane | 269/254 R X |
| 3,452,976 | 7/1969 | Ross | 269/254 R |
| 4,005,945 | 2/1977 | Gutman | 269/902 X |
| 4,013,807 | 3/1977 | Putney et al. | 427/184 |
| 4,127,680 | 11/1978 | Shirn et al. | 427/80 |

FOREIGN PATENT DOCUMENTS

471838 3/1951 Canada .............................. 269/43

Primary Examiner—John D. Smith
Assistant Examiner—Bernard F. Plantz
Attorney, Agent, or Firm—Ziems, Walter & Shannon

[57] ABSTRACT

A holder holding capacitor elements is transported by a conveyor and brought into an electrolyte impregnating tank, which is then closed up by a cover which is secured to a carrier movable laterally by a linkage and is moved vertically by a swingable link. A vacuum pump is operated to vacuumize the electrolyte impregnating tank, and then an electrolyte to supplying circuit is operated to supply the electrolyte into the tank of a predetermined vacuum, so that the capacitor elements may be impregnated with the electrolyte by the minus pressure of vacuum. An absorbing device with a pump is operated to absorb the extra electrolyte around the capacitor elements which are placed in the device.

4 Claims, 6 Drawing Figures

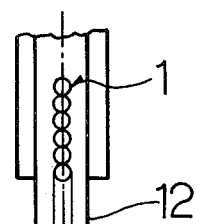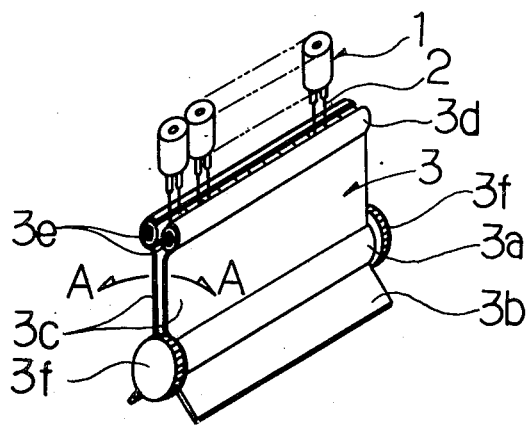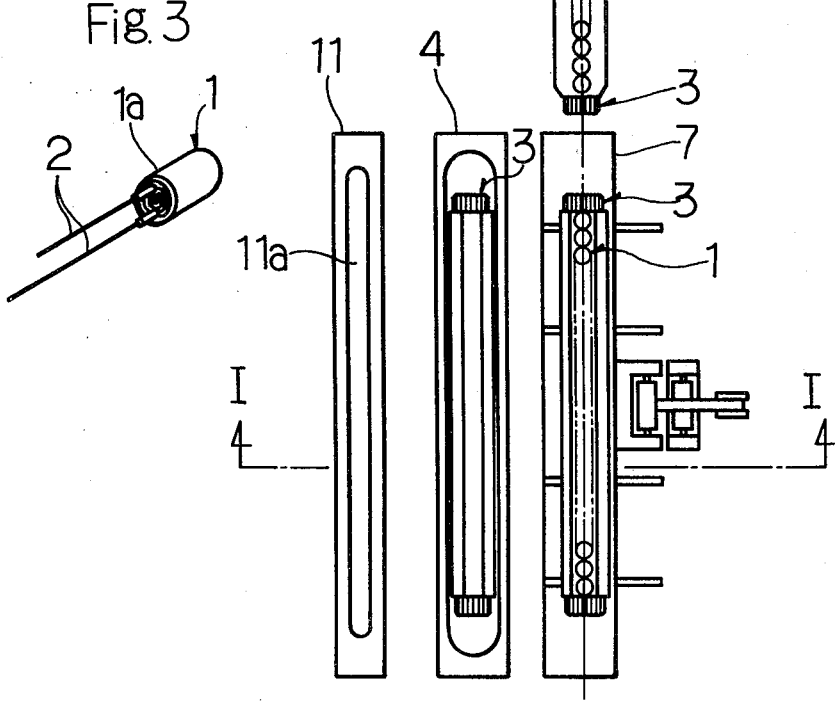

ELECTROLYTE IMPREGNATING DEVICE FOR CAPACITOR ELEMENTS

CROSS REFERENCE TO RELATED APPLICATIONS

This is a continuation-in-part of U.S. patent application Ser. No. 327,218, filed Dec. 3, 1982 now abandoned; in turn, a continuation of abandoned U.S. patent application Ser. No. 153,008, filed May 27, 1980 now abandoned.

BRIEF DESCRIPTION OF THE INVENTION

The invention relates to an electrolyte impregnating device for capacitor elements and, more particularly, relates to a device automatically operated to impregnate the capacitor elements with the electrolyte to remarkably heighten the production of the electrolytic capacitor elements together with the preceding and following sequential processes.

For attaining this object, the device of the invention substantially comprises a base having a support, holder means holding a predetermined number of capacitor elements and positioned on the support, electrolyte impregnating tank means fixedly mounted on the base and having a hollow chamber opened at one end thereof, cover means for closing up the opened end of the hollow chamber, carrier means supporting the cover means and movable laterally and vertically relative to the base, linkage means mounted on the base and operated to move the cover carrier means relative to the base, means swingably operated to move the cover carrier means vertically relative to the base, conveyer means for transporting the capacitor element holder means into the hollow chamber of the electrolyte impregnating tank means, vacuum means conducted to the hollow chamber of the electrolyte impregnating tank means and operated, when the opened end of the chamber is closed up by the cover means, to vacuumize the chamber, electrolyte supplying means conducted to the hollow chamber of the electrolyte impregnating tank means and operated to supply the electrolyte into the hollow chamber when a predetermined vacuum of the chamber is reached. Further, according to the invention, an absorbing device is provided to absorb the extra electrolyte around the capacitor elements after the capacitor elements are impregnated with the electrolyte in the vacuumized chamber of the tank.

So far, it has been considered to be very difficult to make automatic the electrolyte impregnation process of capacitor elements in relation to the preceding and following sequential processes. Actually, there has been no automatic process for this object. It has been generally known that the capacitor elements are manually brought into a separately provided tank, which is to be vacuumized and supplied with the electrolyte, in such a condition (1) that the capacitor elements are roughly placed in a receptacle, or in such a condition (2) that the capacitor elements are individually attached in series to an adhesive tape which is to be wound up on a reel.

Such a prior method has been accompanied by the defects that the electrolyte, attached also to the leads (generally tin coated) of the capacitor elements to the circuit printing plate, and that a constant amount of electrolyte impregnation is not maintained all over the capacitor elements after the extra electrolyte is taken off from these elements by means of the conventional centrifugal machine.

Further, since the electrolyte impregnating operation is made by manual labor, so many processing stages are needed lowering the efficiency of the following operation, such as that of the assembling machine.

Especially the defect of the condition (1) is that since the capacitor elements are collectively and roughly dealt with, the deformation of the capacitor heads and leads is unavoidable, and this makes it very difficult to automatically insert into the assembling machine in the next stage. On the other hand, the condition (2) requires a special machine to attach the capacitor elements to the adhesive tape and a special electrolyte impregnating tank. Moreover, the adhesive tape, once used, is useless anymore. This adds to the processing cost.

The present invention has been provided to eliminate the defects and disadvantages of the prior art. It is a primary object of the invention to provide an electrolyte impregnating device which is simple in structure and effective in operation and is automatically operated to impregnate the capacitor elements with the electrolyte.

It is another object of the invention to provide a device which is effectively operated to heighten the production of electrolytic capacitor elements together with the preceding and following sequential processes.

It is another object of the invention to maintain a predetermined amount of the electrolyte in the device for the purpose of impregnating the capacitor elements with the electrolyte only in a predetermined part thereof. It is another object of the invention to provide a device effectively operated to absorb the extra electrolyte attached around the capacitor elements.

It is still another object of the invention to provide a device effectively operated to produce the electrolytic capacitor elements each impregnated with a constant amount of the electrolyte.

The other features and advantages of the invention will be apparent from the following description of the embodiment in reference to the attached drawings, in which, FIG. 1 is a front elevational view of the device according to the invention partly shown in section along the line I—I of FIG. 4;

FIG. 2 is a perspective view of a capacitor element holder, which is a part of the invention;

FIG. 3 is a perspective view of a capacitor element to be processed by the device of the invention;

FIG. 4 is a plan view of the device of the invention partly omitted;

DETAILED DESCRIPTION OF THE INVENTION

Figure 1:
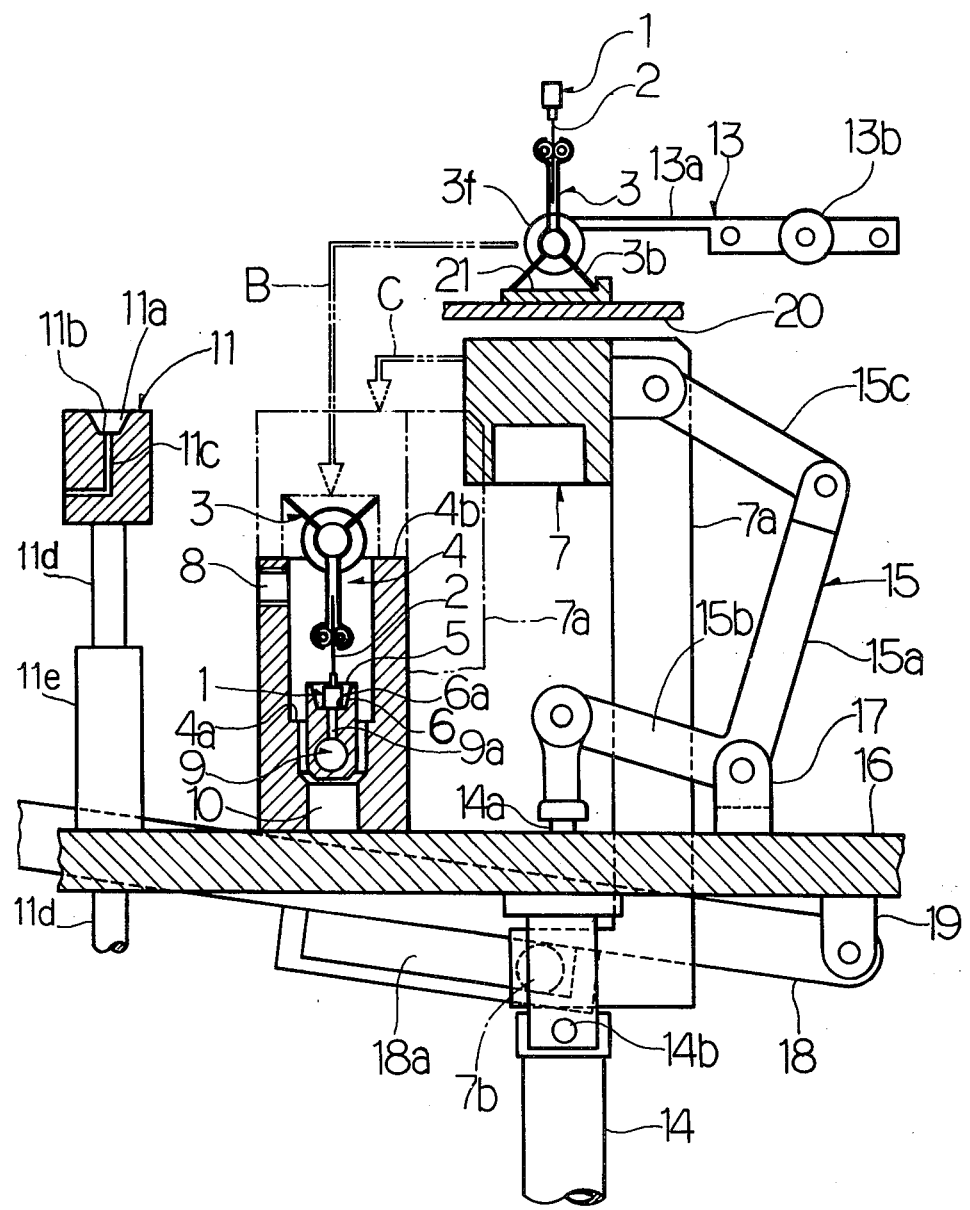

In reference to FIGS. 1-4, the reference numeral 1 denotes a capacitor element having a pair of leads 2 and held by a holder 3 with a pair of feet 3b. The holder 3 is positioned on a guide rail 21 secured to a support 20 which is integral with a base 16 of the device of the invention. A conveyer 13 has a laterally extended arm 13a and an axially movable cylinder 13b, and the arm 13a is detachably connected to the holder 3.

An electrolyte impregnating tank 4 is fixedly positioned on the base 16. The tank 4 has a hollow chamber with a bottom 4a and is opened at the upper end 4b thereof. The tank 4 is provided therein with a sectionally cup-shaped recess 6 at the bottom 4a thereof, but at a level higher than the bottom 4a as shown. At the lower part in the tank there is provided an electrolyte supplying inlet 9 which is conducted to the cup-shaped recess 6 at the bottom 6a thereof by a vertical channel 9a. An electrolyte exhausting outlet 10 is formed at the lower end of the tank 4. The outlet 10 is conducted to the hollow chamber of the tank 4 through the channels 4a on both sides of the cup-shaped recess 6 so that the electrolyte overflowed from the cup-shaped recess 6 may be returned to an external electrolyte storing tank (not shown). The electrolyte impregnating tank 4 has an opening 8 formed on one side thereof, which is conducted to an external vacuum circuit including a vacuum pump (not shown). The tank 4 is closed up by a cover 7 through a sealing element such as an O-ring arranged therebetween, after the holder 3 with the capacitor elements 1 is brought into the tank 4.

On one side of the electrolyte impregnating tank 4 there is provided an electrolyte absorbing mechanism 11 which is formed with a sectionally cup-shaped recess 11a substantially same with the cup-shaped recess 6 of the electrolyte impregnating tank 4. The recess 11a is, at the bottom thereof, conducted through an inverted L-shape channel 11c to an absorbing pump (not shown). The electrolyte absorbing mechanism 11 is placed on the upper end of a vertical shaft 11d which is axially displaceable in a guide 11e positioned on the base 16 of the device.

The tank cover 7 is secured to the upper end of a vertically elongated carrier 7a which is provided, at the lower end thereof, with a pin 7b which is in engagement with a laterally extended guide groove 18a of a swingable link 18 which is at one end thereof turnably mounted on a projection 19 on the underside of the base 16 as shown. A bellcrank lever 15 is at the intermediate part thereof turnably mounted on a projection 17 on the upper side of the base 16. One arm 15a of the bellcrank lever 15 is at the free end thereof pivotally connected to one end of a link 15c, the other end of which being pivotally connected to the upper end of the carrier 7a. On the other hand, the other arm 15b of the bellcrank lever 15 is at the free end thereof connected to the upper end of a vertical rod 14a which is inserted into a vertical cylinder 14 which is turnable at a pivot 14b. The rod 14a is vertically moved by the force of a fluid such as the air.

As shown in FIG. 2, the capacitor element holder 3 consists of a pair of holding plates 3c each hinged at the lower end thereof on a base part 3a. The holding plates 3c are each formed at the upper end thereof with a sectionally arc-shaped element holding part 3d. Elongated rubbers 3e are inserted into the element holding parts 3d, respectively, to elastically hold the capacitor elements 1. The elongated rubbers 3e are each severed at least partially across their radial or transverse dimensions on lines 3g (FIGS. 2, 5 and 6) spaced at intervals corresponding to the space between the capacitor elements 1 held by the holder 3 so that the capacitor elements 1 may not interfere with each other on the holder 3. This is to prevent the failure of the element holding function of the holder 3.

Figure 5:
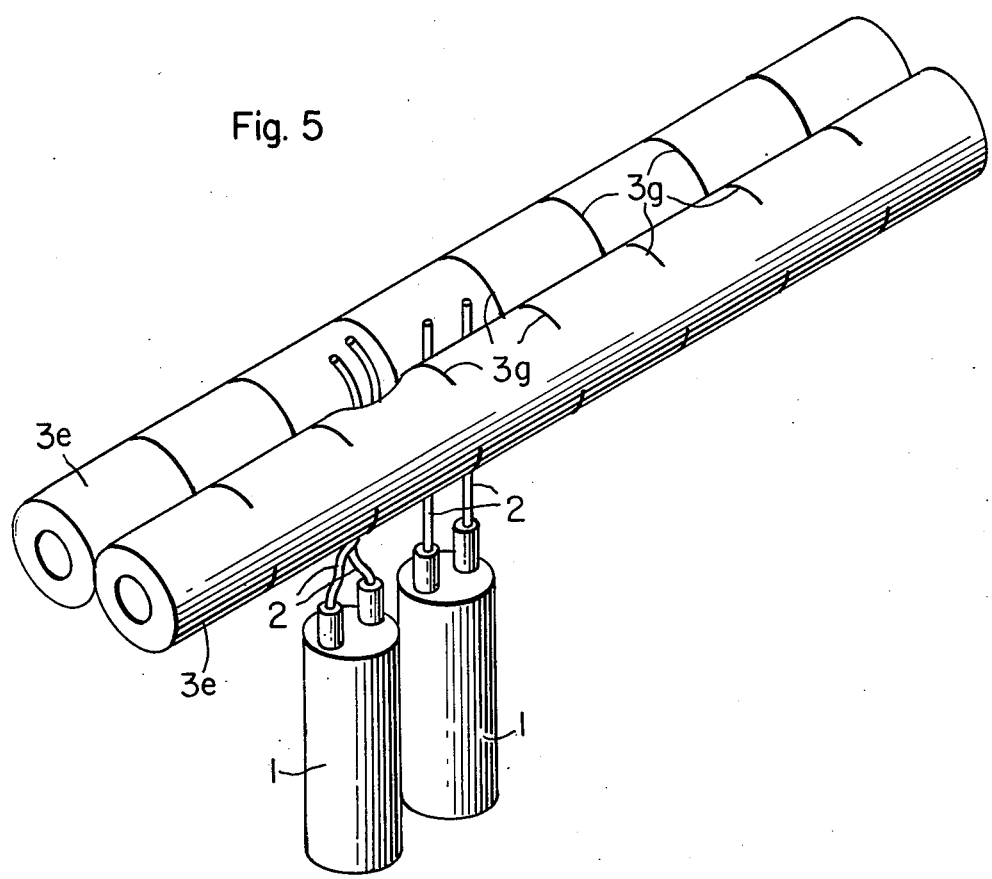
FIG. 5 is an enlarged perspective view of capacitor holding components forming part of the device shown in FIG. 2.
Figure 6:
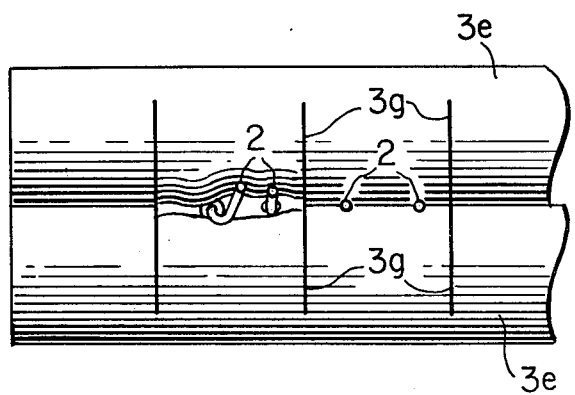
FIG. 6 is a fragmentary plan view of the component shown in FIG. 5.

As shown most clearly in FIGS. 5 and 6 of the drawings, this spaced cutting of the rubbers 3e develops a plurality of individually compressible adjacent segments between the lines 3g. Thus, even in the event the leads 2 on any one of the capacitors are bent or twisted to a point where the composite thickness of the bent or twisted leads would prevent closure of the rubber segments on opposite sides of such bent or twisted leads against each other, the obstruction represented by such bent or twisted leads will neither cause the holding plates 3c to remain open nor interfere with proper retention of adjacent capacitors. In other words, the severance lines 3g isolate rubber spreading action caused by bent or twisted leads to the segment of the rubbers 3e confronting the obstruction.

The element holder 3 has rotational elements 3f, 3f mounted on both sides of the base part 3a thereof. These rotational elements 3f, 3f are each formed with a roulette therearound, function of which will be explained herein later. The feet 3b are biased by a spring (not shown) in the opened condition as shown, thereby to function to close the element holding plates 3c.

In reference to FIG. 4, a straightly advancing vibrator 12 operates to arrange the capacitor elements 1 one by one in alignment above the holder 3 in such a condition that the head 1a of the element 1 is positioned up side and the leads 2 are directed downwardly, so that the holder 3 may hold the aligned capacitor elements at the leads 2 thereof. Operation of the device is as follows:

The straightly advancing vibrator 12 is operated to transport the capacitor elements in alignment in such a condition that the leads 2 of the capacitor elements 1 are downwardly directed, until these elements 1 come to just above the holder 3 having the holding plates 3c opened as shown by the arrow marks A, A in FIG. 2 against the action of the spring (not shown). If a predetermined number of the capacitor elements, for example, 20 pieces, is reached, the holding plates 3c are closed by the action of the spring (not shown) to cause the upper holding parts 3d to hold the capacitor elements 1 at the leads 2 thereof in alignment and in a same level as shown in FIG. 2.

Then the conveyer (13) in FIG. 1 is operated to transport the holder 3 toward the electrolyte impregnating tank 4 until the holder 3 is positioned in alignment with the tank 4 on one side thereof as shown in FIG. 4. Then the holder 3 turns upside down, on the conveyer 13, by its own weight around the opposite rotational elements 3f, 3f, thereby to provide a condition in which the heads 1a of the capacitor elements 1 are pendent from the holder 3. Then the conveyer 13 is operated to transport the holder 3 in the leftward direction until the holder 3 comes to just above the electrolyte impregnating tank 4, and then the conveyer 13 is operated to move vertically in the downward direction until the opposite rotational elements 3f, 3f are placed on the supports (not shown) which are oppositely arranged on both sides lengthwise of the tank 4. This process is shown by the arrow mark B in FIG. 1. In this condition, the heads 1a of the capacitor elements 1 are wholly positioned in the sectionally cup-shaped recess 6 of the electrolyte impregnating tank 4 as shown.

Then the vertical rod 14a is downwardly moved by actuation of a fluid operated mechanism (not shown). As the result, the bellcrank lever 15 is turned in the counterclockwise direction to displace the vertically elongated cover carrier 7a in the leftward direction by way of the link 15c along the laterally elongated groove 18a of the swingable link 18, until the cover 7 on the carrier 7a comes to just above the electrolyte impregnating tank 4. Simultaneously, the swingable link 18 is turned in the counterclockwise direction in FIG. 1 by an operating mechanism (not shown), thereby to displace the cover carrier 7a downwardly. Thus, the cover closes up the electrolyte impregnating tank 4 as shown by the imaginary line in FIG. 1. This process is shown by the arrow mark C.

Then the vacuum circuit is operated to vacuumize the closed chamber of the electrolyte impregnating tank 4. When a predetermined degree of a vacuum is reached, the operation of the vacuum circuit is automatically stopped. Simultaneously, the electrolyte supplying circuit (not shown) is operated to allow the electrolyte into the closed chamber of the electrolyte impregnating tank 4. The electrolyte is, therefore, absorbed into the recess 6 within the chamber from the inlet 9 and the conducting channel 9a by the minus pressure of vacuum. The electrolyte fills up the recess 6 and forms an upper electrolyte surface 5. The extra electrolyte overflows from the recess 6, and therefore, the highest level 5 of the electrolyte is maintained. The recess 6 is so designed as to maintain the highest electrolyte surface 5 at a level higher than the heads of the capacitor elements 1, but lower than the roots of the leads 2, so that only the heads of the capacitor elements 1 may be impregnated with the electrolyte and the leads 2 may be free of the electrolyte.

As the predetermined level of the electrolyte is attained, the heads of the capacitor elements 1 are impregnated with the electrolyte by the minus pressure of vacuum in the chamber, and then the operations of the vacuum circuit and the electrolyte supplying circuit are stopped. In this case, since no electrolyte is attached to the leads 2 of the capacitor elements, there is no adverse influence to the later soldering operation of the capacitor elements.

When the electrolyte impregnation of the capacitor elements 1 is finished, the electrolyte recovering pump circuit (not shown) is operated. Due to the operation of the pump circuit, the vacuumized chamber of the electrolyte impregnating tank 4 is released to the pressure of atmosphere, which momentarily acts on the capacitor elements 1 to further compress the latter. The electrolyte is, therefore, further pressed deep into the capacitor elements 1, and as the result, a secured impregnation of the electrolyte is obtained.

Then the swingable link 18 is turned in the clockwise direction by the operating mechanism and simultaneously the vertical rod 14a is moved in the upward direction. As the result, the cover carrier 7a is brought up together with the cover of and simultaneously moved in the rightward direction by way of the linkage 15, 15c to the position shown by the solid line in FIG. 1 from the position shown by the imaginary line. Thus, the cover 7 is taken off from the electrolyte impregnating tank 4.

Then the electrolyte absorbing mechanism 11 is elevated to a predetermined level. Simultaneously, the conveyer 13 is operated to transport the capacitor element holder 3 toward the electrolyte absorbing mechanism 11 and positions the heads 1a of the capacitor elements 1 wholly into the sectionally cup-shaped recess 11a of the mechanism 11. Then the absorbing pump (not shown) is operated to absorb the extra electrolyte around the heads 1a of the capacitor elements 1. In contrast to the conventional method to take off the extra electrolyte by means of the centrifugal separator, the absorbing method of the invention maintains a constant amount of the electrolyte impregnated in the capacitor elements 1 because this method simply absorbs the extra electrolyte around the capacitor elements. If the electrolyte impregnating process is finished, the capacitor elements 1 are released from the holder 3 and transported to the next processing stage. Then the empty holder 3 is brought back by the conveyer 13 to the position under the element advancing vibrator 12, and the same electrolyte impregnating process is repeated automatically.

According to this invention, 20 pieces of capacitor elements are automatically impregnated with the electrolyte at a time in about 30 seconds, namely 1.5 seconds per capacitor element. Of course, it is possible to increase the number of capacitor elements to be impregnated with the electrolyte for the purpose of speeding up the production the electrolytic capacitor elements without the need of manual labor.

What is claimed is:

1. Apparatus for processing capacitor elements in a chamber vacuumized to impregnate the capacitor elements, each having a pair of leads, with an electrolyte which is supplied to the vacuumized chamber from an external supply, said apparatus comprising: holder means having a pair of hinged elements each defining a laterally elongated free end thereon for releasably holding a predetermined number of capacitor elements by the leads thereof, a pair of elastic members each elongated for substantially the length of said laterally elongated free ends and mounted one on the free end of each of said hinged elements, said elastic members being transversely severed at intervals spaced along the length thereof in correspondence to the spacing of capacitor elements held by the holder thereby to provide individually compressible adjacent segments of said elastic members for engaging and retaining the leads of each capacitor, respectively.

2. Apparatus as recited in claim 1, including transporting means located externally of the electrolyte impregnating chamber for holding and transporting the holder means into and out of the electrolyte impregnating chamber.

3. Apparatus for processing capacitor elements in a chamber vacuumized to impregnate the capacitor elements with an electrolyte which is supplied to the vacuumized chamber from an external supply, said apparatus comprising: holder means having a pair of hinged elements for releasably holding a predetermined number of capacitor elements, and transporting means located externally of the electrolyte impregnating chamber for holding and transporting the holder means into and out of the electrolyte impregnating chamber, said holder means comprising an elongated base on which said pair of holding elements are hinged, said elongated base having rotatable elements provided on opposite ends thereof, each of said rotatable elements having a roulette therearound so that said holder means may turn upside down under its own weight while being transported into the electrolyte impregnating chamber by said transporting means.

4. The apparatus as defined by claim 2, further comprising: electrolyte absorbing means to absorb extra electrolyte from the electrolyte impregnated capacitor elements after the holder means holding the capacitor elements has been transported to the electrolyte absorbing means by the transporting means from the electrolyte impregnating chamber.

* * * * *